United States Patent [19]

Stöhr et al.

[11] Patent Number: 5,069,327
[45] Date of Patent: Dec. 3, 1991

[54] SHAVINGS CONVEYOR

[75] Inventors: Albert Stöhr, Markt Schwaben; Alfred Rehle, München, both of Fed. Rep. of Germany

[73] Assignee: Gebr. Hennig GmbH, Fed. Rep. of Germany

[21] Appl. No.: 505,408

[22] Filed: Apr. 6, 1990

[30] Foreign Application Priority Data

Apr. 20, 1989 [DE] Fed. Rep. of Germany ....... 3913019

[51] Int. Cl.⁵ ............................................. B65G 19/00
[52] U.S. Cl. .................................... 198/725; 198/494; 198/729
[58] Field of Search ............... 198/493, 494, 717, 725, 198/726, 727, 728, 729, 730, 731, 860.1

[56] References Cited

U.S. PATENT DOCUMENTS

| 2,357,796 | 9/1944 | Hapman | 198/725 X |
| 2,703,170 | 3/1955 | Dmohowski | 198/730 |
| 2,710,683 | 6/1955 | McClenny, Jr. | 198/841 X |
| 2,833,152 | 5/1958 | Hedlund et al. | 198/730 |
| 3,589,502 | 6/1971 | Maillet et al. | 198/727 X |
| 4,074,801 | 2/1978 | Monk et al. | 198/494 X |
| 4,821,866 | 4/1989 | Melgaard | 198/494 |
| 4,944,384 | 7/1990 | Herron | 198/494 |

FOREIGN PATENT DOCUMENTS

| 2833363 | 2/1980 | Fed. Rep. of Germany | 198/730 |
| 3005109 | 8/1981 | Fed. Rep. of Germany | 198/731 |
| 0693031 | 6/1953 | United Kingdom | 198/729 |
| 1113671 | 5/1968 | United Kingdom | 198/728 |
| 2127372 | 4/1984 | United Kingdom | 198/731 |

Primary Examiner—Robert P. Olszewski
Assistant Examiner—James R. Bidwell
Attorney, Agent, or Firm—Hopkins & Thomas

[57] ABSTRACT

The invention relates to a shavings conveyor which has a continuously turning conveyor belt (1) provided with two lateral conveyor chains (2) as well as a housing (6) equipped with guide rails (8) for these conveyor chains, openings (11, 12) for the coolant to pass through being provided in the upper guide rails (8) of the conveyor chains. In this way a structurally simple conveyor is produced in which the delivered coolant can run off laterally in a reliable and quick manner through the region of the upper conveyor run (14).

9 Claims, 2 Drawing Sheets

SHAVINGS CONVEYOR

BACKGROUND OF THE INVENTION

The invention relates to a shavings conveyor in which shavings and coolant are received on the upper run of a conveyor belt which carries scraper strips that travel along a wear plate to carry away the shavings.

Shavings conveyors of this type are known in the art as so-called upper run shavings conveyors. They are used above all in machine tools which remove shavings, serving to take away the shavings which are produced. The shavings to be taken away are delivered to the shavings conveyor particularly in the region of its non-driven rear turn-round section through an opening arranged on the upper face and extending over a specific part of the length of the shavings conveyor.

Since a large quantity of the cooling fluid which is necessary for cooling the tool generally passes together with the shavings into the shavings conveyor, care must be taken to ensure that this cooling fluid can run off separately from the shavings which are to be removed. For this purpose an outlet connected to an appropriate container is generally provided in the conveyor housing in the region of the rear turn-round section. If in the case of these known shavings conveyors the conveyor belt takes the form of a scraper conveyor belt (with scraper conveyor strips) and a conveying base associated with the upper run of this conveyor belt, then outlet holes (similar to a perforated screen) are provided for example in this conveying base through which the cooling fluid can run off downwards, whilst the shavings are removed separately.

However, in these known constructions a number of difficulties occur. For instance it repeatedly happens that shavings become jammed in the outlet openings for the cooling fluid and thus hinder or entirely stop the movement of the conveyor belt. If the coolant openings are too small or even if the quantities of coolant are too great, the housing of the shavings conveyor becomes so full of cooling fluid that it is no longer capable of receiving and removing the fluid in the necessary manner. On the other hand, however, there is a requirement to keep the overall height of a shavings conveyor as low as possible.

SUMMARY OF THE INVENTION

The object of the invention, therefore, is to create a shavings conveyor which has relatively small cross-sectional dimensions and is distinguished by a particularly simple construction, extremely reliable transport of the shavings and sufficient and unhindered possibilities for the coolant to flow off.

In the shavings conveyor according to the invention the openings for the coolant to pass through, which are necessary so that the coolant carried along with the shavings can flow off, are provided—quite differently from the known constructions described above—in the two guide rails arranged laterally in the housing for the two conveyor chains, that is to say these coolant openings are also located on both sides adjacent the actual conveyor belt which is running round continuously. This has the advantage that smooth wear plates (conveying bases) which do not allow any possibility for the shavings which are to be removed to remain caught or to jam can be arranged in the region of the conveyor belt conveying the shavings. Furthermore, the coolant openings are provided in an extremely advantageous manner in lateral regions, namely in the guide rails of the conveyor chains, in such a way that they cannot come into contact with the shavings which are to be removed and thus they can always ensure that the coolant (cooling fluid) can flow unhindered and satisfactorily between the scraper conveyor strips into the lower region of the entire shavings feed length of the housing, whence the coolant can be removed in the usual way.

Since as a result of the measures according to the invention the coolant can flow off unhindered at the side of the actual conveyor belt and also advantageously at the side (towards the exterior) of the two conveyor chains, there is no danger whatsoever that this upper run shavings conveyor according to the invention can be overfilled with coolant, so that the cross-sectional dimensions of the conveyor housing, particularly its overall height, can be kept relatively small without hindering the good conveying function and capacity.

The guide rails for each upper run of the two conveyor chains preferably run approximately in the region of a substantially vertical side wall of the housing. In this case, according to the invention each guide rail is formed by a part with multiple bends in cross-section, particularly a sheet metal part with multiple bends, and it has a flat guide section which is aligned approximately at right angles to the appertaining side wall of the housing along which the conveyor chain moves and on the inner edge of which is provided a holding section which is bent against the lower run of the conveyor belt and bears a wear plate which is mounted so as to be replaceable, thus forming a conveying base for the upper run of the conveyor belt. Thus each guide rail can preferably be formed by a sheet material profile which can be produced extremely simply.

In a first embodiment the coolant openings can be made in the edge regions of the flat guide sections of the guide rails adjacent to the appertaining side wall of the housing, which means that—viewed in cross-section through the shavings conveyor, the coolant openings are offset towards the exterior with respect to the rollers of the conveyor chains to such an extent that these openings cannot impede the satisfactory smooth running of the conveyor chains.

However, in the outer edge of the flat guide section of each guide rail adjacent to the appertaining side wall of the housing a wall part can also be provided which—viewed in cross-section—is bent upwards like a leg, is a clear distance from the side wall of the housing and has the coolant openings made in it. This arrangement of the openings, which are placed particularly far towards the exterior but maintain a sufficient distance from the corresponding side wall of the housing, ensures that the coolant can flow off particularly reliably and free of shavings out of the conveying region of the upper run.

BRIEF DESCRIPTION OF THE DRAWING

The invention will be described below in greater detail with the aid of the drawings, in which.

DETAILED DESCRIPTION

Figure 1:
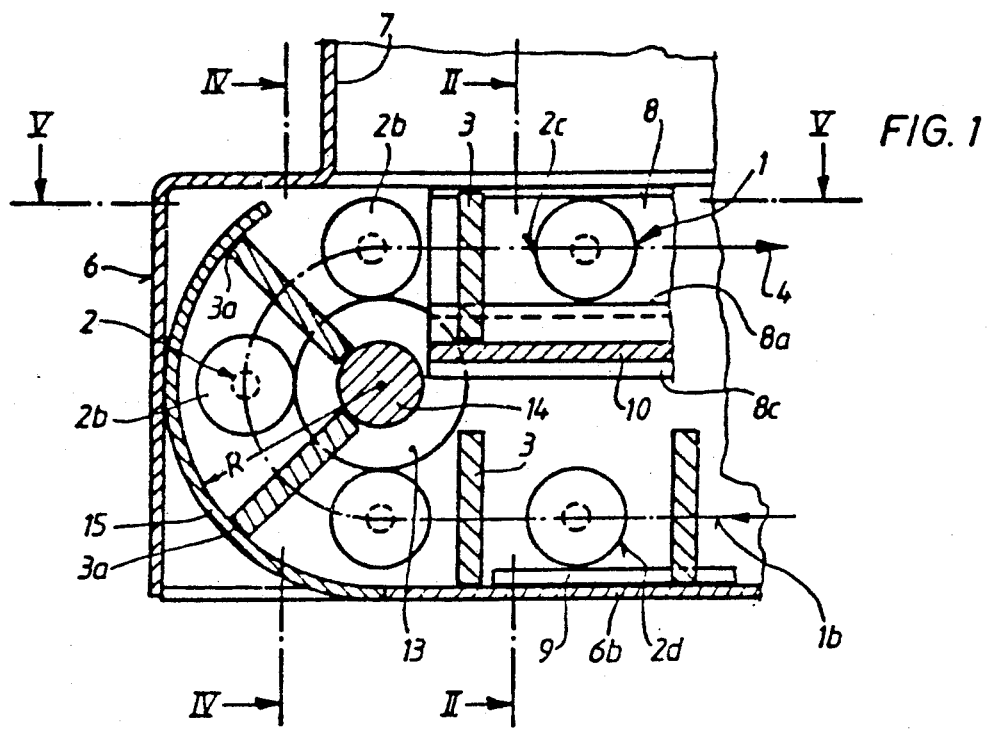
FIG. 1 shows a longitudinal sectional view the section approximately along the line I—I in FIG. 2 through the rear non-driven turn-round section of the shavings conveyor.

The drawings are somewhat simplified and first and foremost only those parts and features of the shavings conveyor are shown which are important to the explanation of the present invention. For this reason the rear turn-round section, which as a rule is not driven, of the upper run shavings conveyor is shown, in which is located the feed opening for shavings to be removed and cooling fluid carried along with them. The total length and the guiding of the shavings conveyor can be adapted to the particular circumstances, but otherwise the cross-section of the shavings conveyor over the greater part of its length corresponds approximately to the illustration in FIG. 2. The turn-round section (end section or head end) which is opposite this non-driven turn-round section can be construction in a manner which is known per se and can contain the drive for the roller chains as well as the shavings outlet.

The general construction of this upper run shavings conveyor will be explained first of all with the aid of FIGS. 1 and 2. According to these, the shavings conveyor contains a conveyor belt which in the present example can be formed by a scraper conveyor belt 1 of conventional construction. This scraper conveyor belt 1 is provided in the usual way with two driven lateral conveyor chains 2 which are constructed in the form of side-plate chains which are known per se and which have scraper conveyor strips 3 fixed between them. These scraper conveyor strips are mounted with corresponding spacing along the conveyor chains 2 and extend upright and at right angles to the general conveying direction according to the arrow 4. The scraper conveyor strips 3 are fixed with their transverse ends on corresponding inner side-plates 2a of the conveyor chains 2 so as to be movable. The barrels or rollers 2b which revolve on roller pins 5 are located between inner and outer pairs of side-plates.

The conveyor belt 1 which runs round continuously with its roller chains 2 forms the conveying run in its upper run 1a.

This shavings conveyor also contains a housing 6 which has a substantially rectangular cross-section with two approximately vertical side walls 6a, a substantially flat base 6b and a top wall 6c. In the region of the rear turn-round section of this shavings conveyor which is shown principally in the drawing, a shavings feed opening 7 which extends over a sufficiently great length and through which not only the shavings to be removed but also a more or less large quantity of cooling fluid is delivered forms the shavings feed length.

Guide rails 8 for the two conveyor chains 2 are provided inside the housing 6 near the two side walls 6a as well as in the upper section in order to guide the upper run 2c of each of the two roller chains 2 in the longitudinal supporting direction, and the rollers 2b of these roller chains 2 roll along on corresponding guide surfaces. Guide rails 9, which can provided in the form of flat guide strips on the base 6b of the housing, can also be provided for the lower run 2d of each roller chain.

In this shavings conveyor the construction and arrangement of the guide rails for the upper run 2c of the two roller chains 2 are of particular importance. In this case each guide rail 8 is formed by a part which has multiple bends in cross-section, particularly a sheet metal part with multiple bends or a drawn profile, as is shown in particular in FIG. 2. According to this each upper guide rail 8 first of all has a flat guide section 8a which is aligned at right angles to the appertaining side wall 6a and on which the rollers 2b of the roller chains 2 roll along. On the edge of this flat guide section 8a on the inner housing side a holding section 8b is also provided which is bent substantially at right angles against the lower run 1b of the conveyor belt 1 and of which one edge strip 8c is in turn bent approximately at right angles in the direction of the interior of the housing. With this edge strip 8c the holding section 8b of each guide rail 8 bears a wear plate 10 which will be described in greater detail below. What is important is that each upper guide rail 8 is provided with openings 11 and 12 respectively for the coolant to pass through.

These coolant openings 11 and 12 are generally provided laterally outside the rollers 2b or the roller chains 2 in these guide rails 8.

Figure 2:
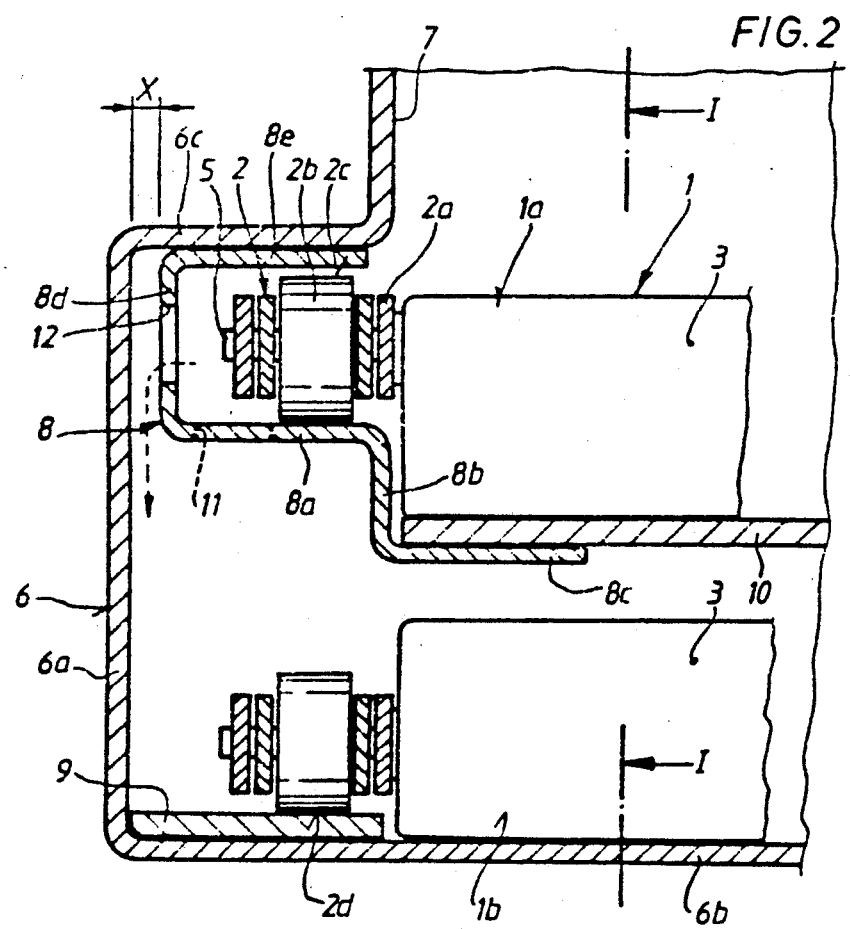
FIG. 2 shows a partial cross-sectional view through this turn-round section the section along the line II—II in FIG. 1.

As is indicated by broken lines in FIG. 2, the openings 11 for the coolant or the cooling fluid can be made in the edge region of the flat guide section 8a of each guide rail 8 adjacent to the appertaining side wall 6a of the housing.

As FIG. 2 also shows, a wall part 8d in the form of a web wall which—viewed in cross-section—is bent upwards like a leg is provided on the outer edge of the flat guide section 8a of each guide rail 8 adjacent to the appertaining side wall 6a of the housing. This wall part 8d is a sufficient clear distance X from the appertaining side wall 6a of the housing, and lateral (upper) coolant openings 12 are made in this wall part 8d of each guide rail 8. The clear distance X between the wall part 8d and the side wall 6a of the housing is of such dimension that cooling fluid emerging from these upper openings 12 can flow off unhindered downwards.

Figure 3:
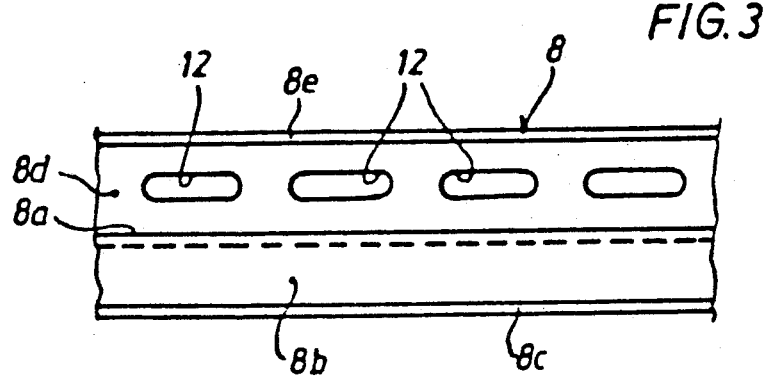
FIG. 3 shows a partial view from the interior of a guide rail for the upper run of a roller chain.

FIG. 3 shows in a partial view of a guide rail 8 from the interior of the housing how the coolant openings 12 can be arranged in the wall part 8d of the guide rails 8. According to this the openings 12 can be arranged in the form of sufficiently large slot openings in at least one row uniformly spaced one behind the other. Naturally, the coolant openings can also be formed by simple round holes or the like and arranged in more than one long row. The same applies to the construction and arrangement of the lower openings 11 in the flat guide section 8a of each guide rail 8.

In this embodiment which is shown in particular in FIG. 2 it is also preferred that the upwardly bent wall part 8d is fixed with its upper edge on the housing 6, in fact directly on the top wall 6c. For this purpose the upwardly bent wall part 8d of each guide rail 8 also has on its upper edge a fixing strip 8e which is bent inwards approximately at right angles and which can be either welded, riveted or screwed firmly to the top wall 6c of the housing in order to hold the entire guide rail 8 securely.

As has already been mentioned above, the downwardly bent holding sections 8b of the two guide rails 8 bear a wear plate 10 on their inwardly bent edge strips 8c. This wear plate 10 is fixed from above on the edge strip 8c, which is bent like a strap, so as to be replaceable, forming a conveying base which is of approximately flat trough shape for the upper run 1a of the conveyor belt. The wear plate 10 which is supported in this way can preferably be screwed to the edge strip 8c so that if necessary, for example for the purpose of access to the region of the lower run of the conveyor belt 1 or for cleaning purposes, it can be released and lifted out of the housing 6.

It should also be pointed out that it can frequently be sufficient if the guide rails 8 are provided only in the long section with coolant openings in the manner described, in which the coolant or the cooling fluid is delivered to the shavings conveyor. This applies in particular to the long section with the shavings feed opening 7 as well as to the region of the non-driven rear turn-round section, of which the rear end is shown above all in FIG. 1.

Figure 4:
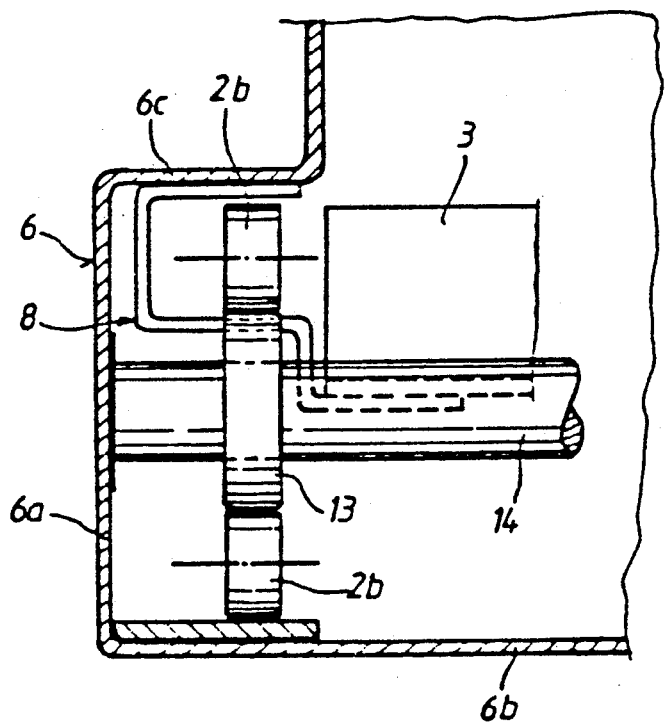
FIG. 4 shows a partial cross-sectional view along the line IV—IV in FIG. 1 in order to explain the deflecting pulleys for the roller chains; and, FIG. 5 shows a partial plan view along the line V—V in FIG. 1.
Figure 5:
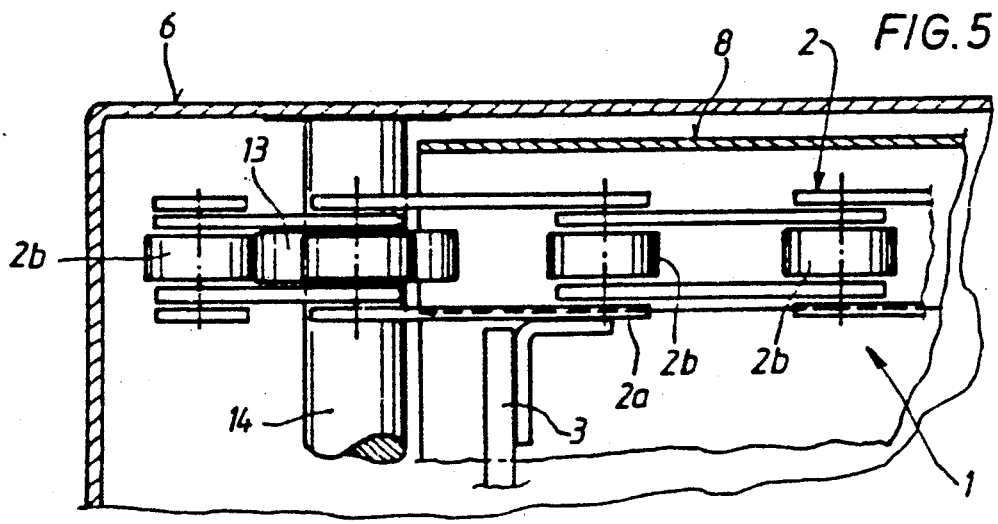

In FIGS. 1, 4 and 5, two deflecting pulleys (only one of which is shown) 13 are mounted spaced from one another on a fixed spindle 14 for guiding and deflecting the roller in this rear turn-round section. These deflecting pulleys 13 lie with their outer peripheral surfaces adjacent to the guide rails 8, i.e. in particular the flat guide sections 8a thereof. Therefore the two deflecting pulleys 13 are fixed, preferably welded, on the spindle 14 with such great axial spacing that due to their corresponding outer peripheral sections the rollers 2b of the appertaining roller chain 2 roll along pulleys 13 and thus the roller chains 2 can be turned out of their lower run 2d into their upper run 2c. The deflecting pulleys 13 are advantageously hardened pulleys, advantageously steel pulleys.

Thus if one compares this non-driven rear turn-round section of the shavings conveyor with constructions which are known in the art, then it can be seen that the deflecting pulleys 13 used here replace the guide sprocket wheels or support roller guide means running in ball bearings which are used in the known shavings conveyors. This provides not only a considerable saving in costs simpler construction, but also facilitates a particularly favourable compact or vertical construction of the conveyor cross-section.

In the upper run shavings conveyor described previously it is also advantageous if the housing 6 has in the region of the rear deflecting pulleys 13 a upwardly bent deflection plate 15 which adjoins the housing base 6b so that it is flush. This deflection plate 15 has a constant bending radius R which corresponds to the bending radius described by the outer edges 3a of the scraper conveyor strips 3 in the scraper conveyor belt deflection (cf. FIG. 1). This deflection plate 15 extends upwards preferably into the region of the shavings feed opening 7, i.e. so far that by means of the scraper conveyor strips 3 of the scraper conveyor belt 1 in the lower run 1b any dirt or the like, possibly parts of shavings, which are also returned can be shovelled to some extent upwards along this deflection plate 15 and can be returned to the region of the wear plate 10. As a result of the construction and arrangement of this deflection plate 15 no dirt particles, shavings residues etc. can collect at this rear end of the illustrated turn-round section, but are returned to the wear plate 10 and thus to the upper run 1a of the scraper conveyor belt which serves as the conveying run so that they are reliably removed with the freshly delivered shavings. Thus this deflection plate 15 provides an extremely reliable cleaning effect for the region of the lower run 1b of the scraper conveyor belt 1.

Finally, for the sake of completeness it should be mentioned that in this upper run shavings conveyor the advantages described are shown to advantage above all when the conveyor belt is constructed in the form of a scraper conveyor belt, as explained with the aid of the drawings. However, a number of the advantages described, i.e. above all the favourable lateral flowing off of cooling fluid through openings (11 or 12) provided in the upper guide rails 8 can be achieved if the conveyor belt is constructed in the form of a link-type or a plate-type supporting belt provided with two lateral roller chains.

While an embodiment of the invention has been shown and described in detail, it should be understood by those skilled in the art that variations and modifications of the disclosed embodiment can be made without departing from the spirit and scope of the invention as described by the following claims.

We claim:

1. A shavings conveyor for use with machine tools, said conveyor comprising:
   a conveyor means including an upper run and a lower run, forming a conveyor belt adapted to turn continuously, said upper run forming a shavings conveyor run, said conveyor means including first and second driven lateral conveyor chains each including an upper run and a lower run, said chains being mounted to spaced rollers,
   a housing including substantially vertical sidewalls and a top wall and including guide rails therein spaced from said conveyor means for guiding said rollers of said upper run of each of said conveyor chains, said guide rails of said conveyor chains including openings therein for allowing liquid to pass therethrough, said guide rails extending in the region of a substantially vertical side wall of the housing, and wherein each guide rail is formed by a metal part which includes multiple bends in cross-section, said multiple bends comprising a flat guide section including an inner edge and an outer edge, each said flat guide section oriented at approximately a right angle to the vertical side walls and on which said rollers move along, a downwardly bent holding section extending downwardly from the inner edge of said flat guide section, which extends toward the lower run of the conveyor belt and which includes a lower edge, a wear plate fixed to the lower edge of said downwardly bent holding section and forming a conveying base for the upper run of the conveyor belt.

2. A shavings conveyor as claimed in claim 1, wherein said guide rails guide said rollers along a path and said openings are located in each guide rail on a side of the path remote from said conveyor means and adjacent to a side wall of the housing.

3. A shavings conveyor as claimed in claim 1, wherein each said guide rail includes a first wall which is bent upwards on the outer edge of the flat guide section of each guide rail, which is adjacent to a side wall of the housing, the said wall including an upper edge portion and being spaced from said side wall of the housing and including openings therein.

4. A shavings conveyor as claimed in claim 3, wherein said first wall is fixed with its upper edge abutting said housing.

5. A shavings conveyor as claimed in claim 1, wherein the downwardly bent holding section of the guid rail has on its lower end an edge strip, and on which the wear plate is supported and is releasably fixed.

6. A shavings conveyor as claimed in claim 1, and including a non-driven turn-round for said conveyor means and said conveyor chains and including a shavings feed opening in said top wall of said housing.

7. A shavings conveyor as claimed in claim 6, wherein said non-driven turn-round has deflecting circular pulleys mounted on a fixed spindle having outer peripheral surfaces adjacent to said guide rails.

8. A shavings conveyor as claimed in claim 7, wherein said deflecting pulleys are of hardened steel material, the axial width of which is adapted to support said rollers or said roller chains.

9. A shavings conveyor as claimed in claim 7, wherein said conveyor means is provided with scraper conveyor strips including outer edges and fixed to the conveyor chains, and said housing includes a radial deflection plate which adjoins the housing base, the constant bending radius (R) of the deflection plate corresponding to the deflection radius described by the outer edges of the scraper conveyor strips while moving through the conveyor means turn around, and the deflection plate extending into a region adjacent the shavings feed opening.

* * * * *